United States Patent
Yu et al.

(10) Patent No.: US 6,895,160 B2
(45) Date of Patent: May 17, 2005

(54) VARIABLE OPTICAL ATTENUATOR

(75) Inventors: Tai-Cheng Yu, Tu-Chen (TW); Chun Yu Lee, Tu-Chen (TW); Yao-Hao Chang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 415 days.

(21) Appl. No.: 09/994,523

(22) Filed: Nov. 26, 2001

(65) Prior Publication Data

US 2003/0049010 A1 Mar. 13, 2003

(30) Foreign Application Priority Data

Sep. 12, 2001 (TW) .................................... 90215719 U

(51) Int. Cl.⁷ .............................................. G02B 6/00
(52) U.S. Cl. ..................................................... 385/140
(58) Field of Search ........................... 385/140, 25, 16, 385/18, 19, 47

(56) References Cited

U.S. PATENT DOCUMENTS

| | | | | |
|---|---|---|---|---|
| 5,539,577 A | * | 7/1996 | Si et al. ...................... 359/629 |
| 5,745,634 A | * | 4/1998 | Garrett et al. .............. 385/140 |
| 6,149,278 A | * | 11/2000 | Mao et al. ................... 359/862 |
| 6,292,616 B1 | * | 9/2001 | Tei et al. ..................... 385/140 |
| 6,374,032 B1 | * | 4/2002 | Mao et al. ................... 385/140 |
| 6,496,619 B2 | * | 12/2002 | Naganuma .................. 385/27 |
| 2003/0223726 A1 | * | 12/2003 | Neukermans et al. ....... 385/140 |

* cited by examiner

Primary Examiner—Zandra V. Smith
Assistant Examiner—Juan Valentin, II
(74) Attorney, Agent, or Firm—Wei Te Chung

(57) ABSTRACT

An optical attenuator (8) includes an input port (1), an output port (4), a fixed reflector (2), a movable reflector (3), two detecting means (6, 7) and a driving device (5). The input port includes a first collimator (13) and a filter (10) attached to the first collimator. The output port includes a second collimator (41) and a splitter (42) connected to the second collimator. Input signals are transmitted from an input fiber (11) through the first collimator and then pass through the filter. The signals passing through the filter are directed by the fixed and the movable reflectors to the second collimator. The angular position of the movable reflector, which is driven by the driving device, determines the proportion of the signals. reflected by the reflectors that are received by the second collimator, which determines the size of the output signals transmitted in an output fiber (421).

15 Claims, 1 Drawing Sheet

VARIABLE OPTICAL ATTENUATOR

BACKGROUND OF THE INVENTION

1. Field of the Invention

The present invention relates to an optical attenuator, and particularly to a variable optical attenuator having an electrical controlling circuit.

2. Description of the Related Art

Optical attenuators are used to optimize the optical power of signals at key points in optical communications networks. For example, in networks having Erbium Doped Fiber Amplifiers (EDFAs), optical attenuators are used between stages of EDFAs to provide constant gain. In Wavelength Division Multiplexer (WDM) systems, optical attenuators are used to adjust optical power of "added" laser signals to match the signals strength of other channels within the network. Optical attenuators can also be used to set signal strength within the range of a particular receiver.

Known methods to obtain a variable optical attenuator include coating a filter element with an attenuation layer having a variable density, and bending optical fibers to get a given attenuation. A variable optical attenuator can also be obtained by changing a distance between a reflector and an input port or an output port.

U.S. Pat. No. 5,745,634 discloses a voltage controlled attenuator comprising a first lens for receiving an incoming light beam, a second lens for outputting the attenuated light beam, an optical detecting means and a controllable attenuating means. The optical detecting means monitors the intensity of the attenuated light beam, and the controllable attenuating means varies the attenuation of the outgoing light beam in response to signals from the detecting means. However, making the attenuating means (such as variable neutral density filters or wedge shaped filters) is very difficult. Furthermore, when a light beam passes through the filters, the reflections of the light beam at the interfaces of the filters can cause the intensity of the outgoing light beam to fluctuate.

BRIEF DESCRIPTION OF THE INVENTION

An object of the present invention is to provide an optical attenuator which controllably attenuates a light beam by using an electrical controlling circuit.

Another object of the present invention is to provide an optical attenuator having a simple and compact structure.

An optical attenuator in accordance with the present invention comprises an input port, an output port, a fixed reflector, a movable reflector, two detecting means and a driving device. The input port includes a first collimator and a filter attached to the first collimator. The output port includes a second collimator and a splitter connected to the second collimator. Input signals are transmitted from an input fiber through the first collimator and then pass through the filter. The signals passing through the filter are directed by the fixed and the movable reflectors to the second collimator. The rotation of the movable reflector will lead to a different coupling between the reflected signals and the second collimator. The detecting means detects the intensity of input signals and output signals and then calculates the attenuation ratio. The driving device then drives the movable reflector in response to the attenuation ratio coming from the detecting means.

Both the input and output ports of the attenuator are arranged on the same side of the reflectors such that the attenuator provides an easy to install, simple and compact package.

DETAILED DESCRIPTION OF THE INVENTION

Figure 1:
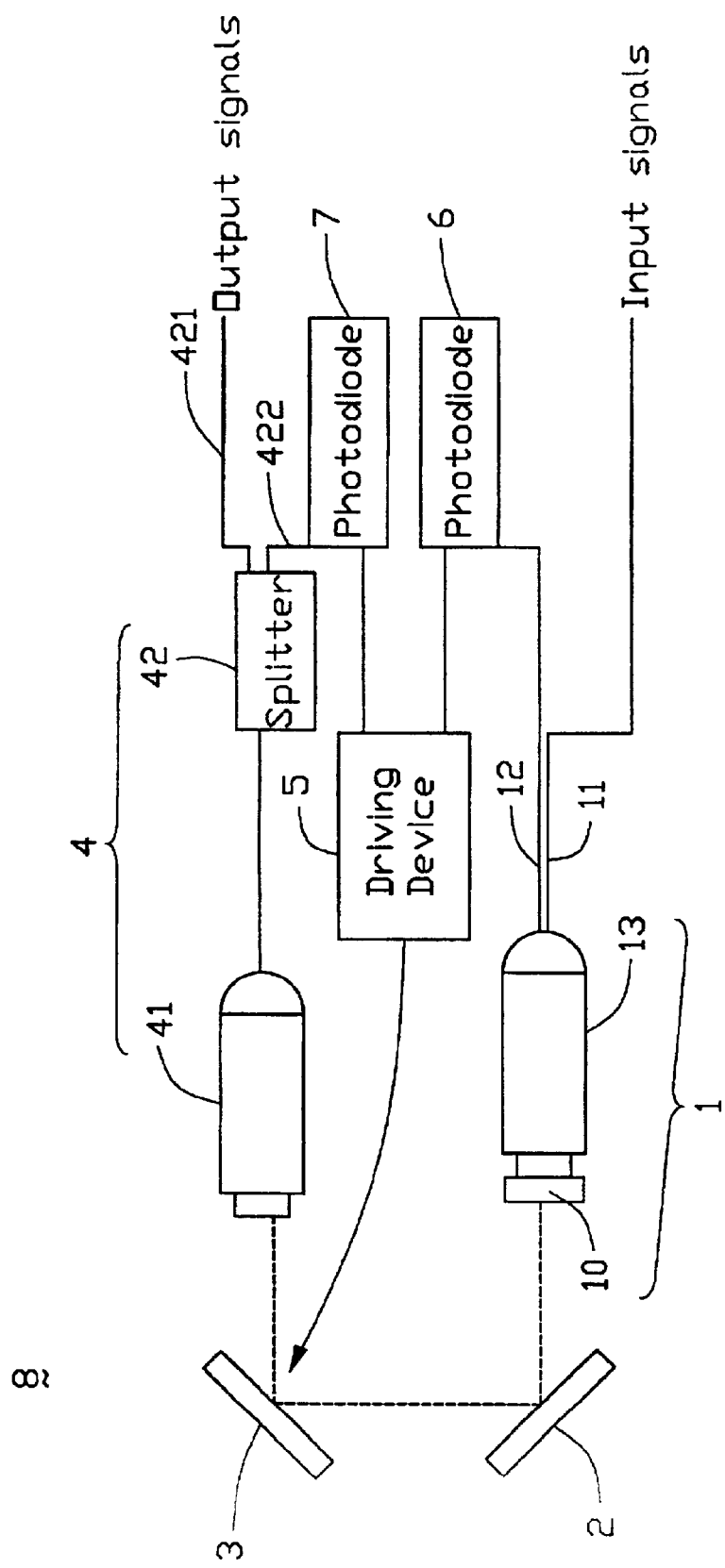
FIG. 1 is a schematic diagram of a variable optical attenuator according to the present invention.

As shown in FIG. 1, an optical attenuator 8 of the present invention comprises: an input port 1, an output port 4, a fixed reflector 2, a movable reflector 3, two photodiodes 6, 7 and a driving device 5. The optical attenuator 8 attenuates optical signals traveling along an optical path.

The input port 1 includes a first collimator 13 and a filter 10 attached to the first collimator 13. One end of each of an input fiber 11 and an input sampling fiber 12 are retained in the first collimator 13. The output port 4 includes a second collimator 41 and a splitter 42 connected to the second collimator 41. One end of each of an output fiber 421 and an output sampling fiber 422 are retained in the splitter 42.

Input signals are transmitted along the optical path (not shown) through the input fiber 11 and into the first collimator 13, and then pass through the filter 10 to the fixed reflector 2. The filter 10 reflects a small part of the input signals, and these reflected signals are directed back through the first collimator 13 to the input sampling fiber 12, and then to the photodiode 6. In this embodiment, the filter 10 reflects about 0.5 percent of the signals input to it. The fixed reflector 2 and the movable reflector 3 are arranged at such an angle that they ensure that some portion of the signals reflected by them are received by the second collimator 41. The signals passing through the second collimator 41 are split by the splitter 42 to be directed along the optical path (not shown) through the output fiber 421 as output signals or to be directed to a photodiode 7 via the output sampling fiber 422. With the apparatus of the present invention, 98 percent of the signals from the second collimator 41 can be transmitted to the output fiber 421.

The photodiodes 6 and 7 detect the intensity of signals transmitted through the input sampling fiber 12 and the output sampling fiber 422, respectively, and these intensities are used by control circuitry to calculate the intensity of the input signals and the output signals. The control circuitry also calculates an attenuation ratio from the signals received by the photodiodes 6 and 7, and uses this attenuation ratio to drive the driving device 5. The attenuation ratio is the ratio of the output signals to the input signals. The driving device 5 then drives the movable reflector 3 to turn to an appropriate angle to achieve a desired attenuation ratio. As the movable reflector 3 rotates, signals reflected off the movable reflector 3 couple in different proportions with the second collimator 41, which changes the attenuation ratio. In other words, as the movable reflector 3 rotates, a portion of the signals reflected off the movable reflector 3 can couple with (pass through) the second collimator 41, and a portion can miss the second collimator 41.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical attenuator for attenuating signals in an optical path, comprising:

an input port for receiving input signal from an input fiber along the optical path;

an output port for splitting attenuated signals into two portions, and for transmitting one portion of the attenuated signals to an output fiber, also along the optical path, and for transmitting a second portion of the attenuated signals to a detecting means;

a fixed reflector;

a movable reflector, which in conjunction with the fixed reflector is for receiving first signals output by the input port and reflecting a portion of said first signals into the output port;

the detecting means being positioned to receive said second portion of the attenuated signals from the output port; and a driving device for driving the movable reflector in response to control signals from the detecting means.

2. The optical attenuator as claimed in claim 1, wherein the input port comprises a first collimator and a filter.

3. The optical attenuator as claimed in claim 2, wherein the filter has a 0.5 percent reflective ratio.

4. The optical attenuator as claimed in claim 2, wherein the first collimator retains an end of the input fiber and an end of a second fiber thereof, and said second fiber receives a part of the input signals reflected by the filter and transmits said part of the input signals reflected by the filter to the detecting means, and the detecting means uses said part of the input signals reflected by the filter together with said second portion of the attenuated signals from the output port to drive the driving device which moves the movable reflector.

5. The optical attenuator as claimed in claim 1, wherein the output port comprises a second collimator.

6. The optical attenuator as claimed in claim 1, wherein the detecting means includes a photodiode.

7. An optical attenuator for attenuating signals in an optical path, comprising:

an input port for receiving input signals from an input fiber along the optical path and for reflecting part of the input signals to a first detecting means;

an output port for splitting attenuated signals into two portions, and for transmitting one portion of the attenuated signals to an output fiber, also along the optical path, and for transmitting a second portion of the attenuated signals to a second detecting means;

a fixed reflector;

a movable reflector, which in conjunction with the fixed reflector is for receiving first signals output by the input port and reflecting a portion of said first signals into the output port;

said first detecting means being positioned to receive said reflected part of the input signals from the input port;

said second detecting means being positioned to receive said second portion of the attenuated signals from the output port; and a driving device for driving the movable reflector in response to control signals from said first and said second detecting means.

8. The optical attenuator as claimed in claim 7, wherein the input port comprises a first collimator and a filter.

9. The optical attenuator as claimed in claim 8, wherein the filter has a 0.5 percent reflective ratio.

10. The optical attenuator as claimed in claim 8, wherein the first collimator retains an end of the input fiber and an end of a second fiber thereof, and said second fiber receives the reflected part of the input signals.

11. The optical attenuator as claimed in claim 7, wherein the output port comprises a second collimator.

12. The optical attenuator as claimed in claim 7, wherein the first and second detecting means each include a photodiode.

13. An optical attenuator for attenuating signals in an optical path, comprising:

an input port connected to an input fiber the input fiber being a component of the optical path, the input port being for receiving an input signal from the input fiber;

an output port connected to an output fiber, the output fiber also being a component of the optical path, the output port being for transmitting an output signal to the output fiber;

a fixed reflector;

a movable reflector, which in conjunction with the fixed reflector forms an optical connection between the input port and the output port;

a detecting means optically connected to the input port and to the output port and comprising components for detecting the intensity of optical signal from the input and output ports, circuitry for comparing the input signal to the output signal, and control circuitry; and a driving device electrically connected to the control circuitry of the detecting means and mechanically engaged with the movable reflector;

whereby the input port transmits a fraction of the input signal, as a first control signal, to the detecting means and transmits the remainder of the input signal, as a first signal, to the fixed reflector and the movable reflector, the fixed reflector and the movable reflector direct the first signal toward the output port as a second signal, and some fraction of the second signal, determined by the relative spatial and angular geometry of the fixed reflector and the movable reflector, is received by the output port as a received signal, and the output port transmits one portion of the received signal as the output signal and transmits the remaining portion of the received signal as a second control signal, to the detecting means, the detecting means measures the intensities of the first and second control signals, makes a comparison of the intensities, and as a result causes its control circuitry to issue driving control signals to the driving device, which actuates the movable reflector to rotate, changing the intensity of the received signal at the output port.

14. The optical attenuator as claimed in claim 13, wherein the input port comprises a first collimator and a filter.

15. The optical attenuator as claimed in claim 13, wherein the output port comprises a second collimator and a splitter.

* * * * *